US00RE35485E

United States Patent [19]

Stewart

[11] E Patent Number: Re. 35,485

[45] Reissued Date of Patent: Apr. 1, 1997

[54] UNI–BRACE

[75] Inventor: David A. Stewart, Elkhart, Ind.

[73] Assignee: Atwood Industries, Inc., Rockford, Ill.

[21] Appl. No.: 302,623

[22] Filed: Sep. 8, 1994

Related U.S. Patent Documents

Reissue of:

[64] Patent No.: 5,244,178
Issued: Sep. 14, 1993
Appl. No.: 896,814
Filed: Jun. 11, 1992

[51] Int. Cl.[6] ..... F16M 13/00

[52] U.S. Cl. ..... 248/429; 248/300; 248/911

[58] Field of Search ..... 248/200, 911, 248/912, 429, 430, 188, 300, 558, 503.1; 297/322, 344.1, 344.13; 411/174, 173

[56] References Cited

U.S. PATENT DOCUMENTS

| | | | |
|---|---|---|---|
| D. 331,342 | 12/1992 | Kinda . | |
| 1,856,950 | 5/1932 | Flintermann . | |
| 1,970,705 | 8/1934 | Montigney . | |
| 2,062,685 | 12/1936 | Tinnerman | 411/174 |
| 2,168,721 | 8/1939 | Tinnerman . | |
| 2,399,958 | 5/1946 | Tinnerman | 336/67 X |
| 3,003,600 | 10/1961 | MacKenzie . | |
| 3,462,190 | 8/1969 | Campbell . | |
| 3,476,342 | 11/1969 | Motl et al. . | |
| 3,685,708 | 8/1972 | Herrington | 224/42.45 R |
| 3,848,937 | 11/1974 | Harder, Jr. . | |
| 4,033,531 | 7/1977 | Levine | 248/558 |
| 4,033,653 | 7/1977 | Doring et al. . | |
| 4,168,050 | 9/1979 | Nerem et al. | 248/393 |
| 4,220,308 | 9/1980 | Strien et al. . | |
| 4,307,865 | 12/1981 | MacCready . | |
| 4,512,543 | 4/1985 | Petrick . | |
| 4,549,765 | 10/1985 | Hoch . | |
| 4,638,546 | 1/1987 | Benshoof . | |
| 4,811,925 | 3/1989 | Fujita et al. . | |
| 4,911,348 | 3/1990 | Rasor et al. | 248/503.1 X |
| 4,961,559 | 10/1990 | Raymor . | |
| 4,967,989 | 11/1990 | Bender | 248/300 X |
| 5,011,209 | 4/1991 | Takarabe et al. . | |
| 5,083,735 | 1/1992 | Negi et al. . | |
| 5,087,009 | 2/1992 | Borlinghaus et al. . | |
| 5,169,091 | 12/1992 | Beroth . | |

FOREIGN PATENT DOCUMENTS

| | | | |
|---|---|---|---|
| 2571794 | 10/1984 | France | 240/430 |
| 135363 | 1/1919 | United Kingdom . | |

OTHER PUBLICATIONS

2–page drawing of Flexsteel Industries, dated Oct. 30, 1990 and Nov. 6, 1990.

Chevy/Dodge/Ford Universal Pedestal Installation Instructions, Jul. 21, 1989.

*Primary Examiner*—Karen J. Chotkowski

[57] ABSTRACT

A uni-brace mechanism is provided which allows a vehicle seat to be attached to the vehicle seat slide adjusters made by various manufacturers. A front bracket and a rear bracket are spaced apart and attached to the underside of a vehicle seat. Each bracket includes two pairs of receiving holes, with each receiving hole having at least one corresponding engagement hole spaced apart from the receiving hole. The various engagement holes combined to form various generally rectangular patterns, spaced at distances to correspond to the bolt patterns found on vehicle seat slide adjusters. A pal nut is inserted into a receiving hole and into engagement with the proper corresponding engagement hole. Pal nut includes a hub with an internal thread which is positioned within the engagement hole. The bolt on the vehicle seat slide adjuster are threaded through the engagement hole and into the hub, attaching the vehicle seat slide adjuster to the bracket.

11 Claims, 3 Drawing Sheets

18
16
40
40
38
34
50
19
12
34
38
40
50
68
68
24
22
28
32
32
14
30
26
50
68
24
28
32
32
22
50
68
24
20

UNI–BRACE

Matter enclosed in heavy brackets [ ] appears in the original patent but forms no part of this reissue specification; matter printed in italics indicates the additions made by reissue.

BACKGROUND AND SUMMARY OF THE INVENTION

The present invention relates generally to vehicle seat mounting mechanisms. More specifically, the present invention relates to mechanisms used to mount vehicle seats which enable the seats to slide forward and rearward.

Vehicle seats which are able to slide forward and rearward in a vehicle are well known. Commonly, vehicle seats are mounted onto a pair of slide tracks which allow the vehicle seat to be slidably located in various positions. A vehicle seat which is slidably mounted has many advantages. It allows for passengers of various sizes to adjust the seat and ride comfortably in the vehicle. Being able to slidably adjust the position of a vehicle seat also facilitates cleaning of the area adjacent the vehicle seat.

Most United States vehicle manufacturers use a slide adjuster assembly having a pair of slide tracks for a vehicle seat which utilizes four bolts, spaced apart in a rectangular configuration. However, each such vehicle manufacturer spaces the four bolts at slightly different locations. For example, the vehicle seat slide adjuster assembly currently manufactured by Chrysler Corporation for full size seats includes four bolts spaced in a rectangular pattern, with the front bolts spaced from the rear bolts at an approximate distance of 12.00 inches. The bolts are spaced side-to-side by approximately 14.72 inches.

In comparison, the vehicle seat slide adjuster currently made by General Motors for its full size seat has a front-to-rear spacing of approximately 13.31 inches and a side-to-side spacing of approximately 14.00 inches. The following table lists approximate spacing dimensions for representative vehicle seat slide adjusters of current manufacture.

| APPLICATION | FRONT/REAR SPACING | WIDTH SPACING |
|---|---|---|
| Chrysler--full-size | 12.00" | 14.72" |
| General Motors--full-size | 13.31" | 14.00" |
| Ford--full size | 13.31" | 14.00" |
| General Motors--Astro | 14.00" | 12.875" |
| Secondary Seating (narrow) | 11.50" | 8.00" |
| Secondary Seating (wide) | 11.50" | 14.00" |

Generally, each OEM manufacturer uses an arrangement which provides sufficient support to carry the weight of the seat as well as a passenger riding thereon. Thus, a manufacturer which utilizes a relatively larger dimension in one direction generally uses a shorter dimension in the transverse direction.

In the past, the industry standard after-market pattern used by all manufacturers had a front/rear spacing of 11.50 inches, and a width spacing of 8 inches. However, recent federal legislation, FMVSS-208, has reclassified conversion vans and trucks as passenger vehicles. Thus, additional safety requirements must be met. Because of these added safety requirements, certain manufacturers are requiring that OEM components must be used. For example, a manufacturer may require that its seat pedestal or seat slide adjuster assembly be used.

These manufacturer requirements have thus forced the after-market seat frame manufacturers to adapt to various OEM mounting patterns. Because each seat manufacturer may adopt different spacing dimensions, the after-market manufacturers are faced with slide adjusters having differing spacing dimensions. Thus, each after-market seat manufacturer has had to produce several seat designs to conform to the various vehicle seat slide adjusters. This is expensive, both in manufacturing costs as well as inventory costs.

In addition to the spacing requirements of the various manufacturers seat slide adjusters, all van and truck seats must also conform to OEM standards for mounting to ensure a proper seating reference point is attained. The seating reference point, or SRP, is needed to maintain the proper angle between the seat belts and the vehicle seat frame. This is needed so that the seat belt may maintain a proper level of performance throughout the sliding motion of the vehicle seat from rearward to forward.

Accordingly, it is an object of the present invention to provide a mechanism which allows a vehicle seat to be attached to any vehicle slide adjuster of current design and dimension.

Another object of the present invention is to provide a mechanism which allows a vehicle seat to be attached to a slide adjuster which is both efficient to manufacture and to maintain in inventory.

These and other objects are attained by a uni-brace mechanism which allows for a vehicle seat to be attached to any vehicle seat slide adjuster of current manufacture. The mechanism includes a front bracket and a rear bracket, spaced apart and attached to the underside of a vehicle seat. Each bracket includes at least one pair of receiving holes, and corresponding engagement holes spaced apart from each receiving hole. The set of engagement holes surrounding each receiving hole are spaced at predetermined distances from one another so as to conform to the spacing and dimensions of the rectangular bolt pattern found on the vehicle seat slide adjuster of the various manufacturers designs.

To secure the vehicle seat slide adjuster to the vehicle seat, the proper set of engagement holes is chosen to match the spacing of the bolts on the vehicle seat slide adjuster. A pal nut is then inserted through each receiving hole and into engagement with the proper corresponding engagement hole. The pal nut includes a hub with an internal thread therein, which is positioned within the engagement hole. The bolts on the vehicle seat slide adjuster are threaded into the hub to retain the vehicle seat slide adjuster to the brackets, and thus to the vehicle seat.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
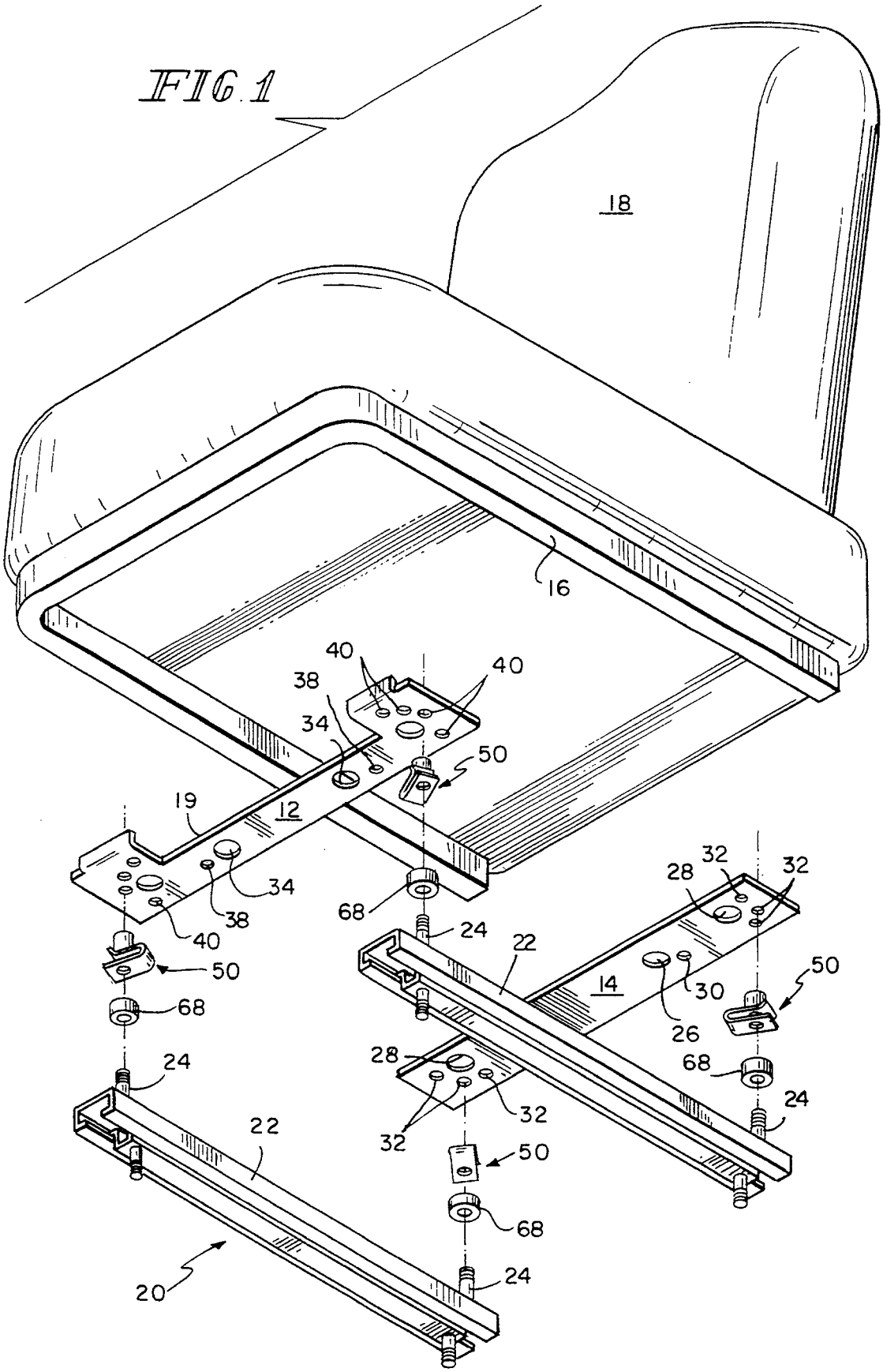
FIG. 1 is an exploded view of the uni-brace mechanism of the present invention.
Figure 2:
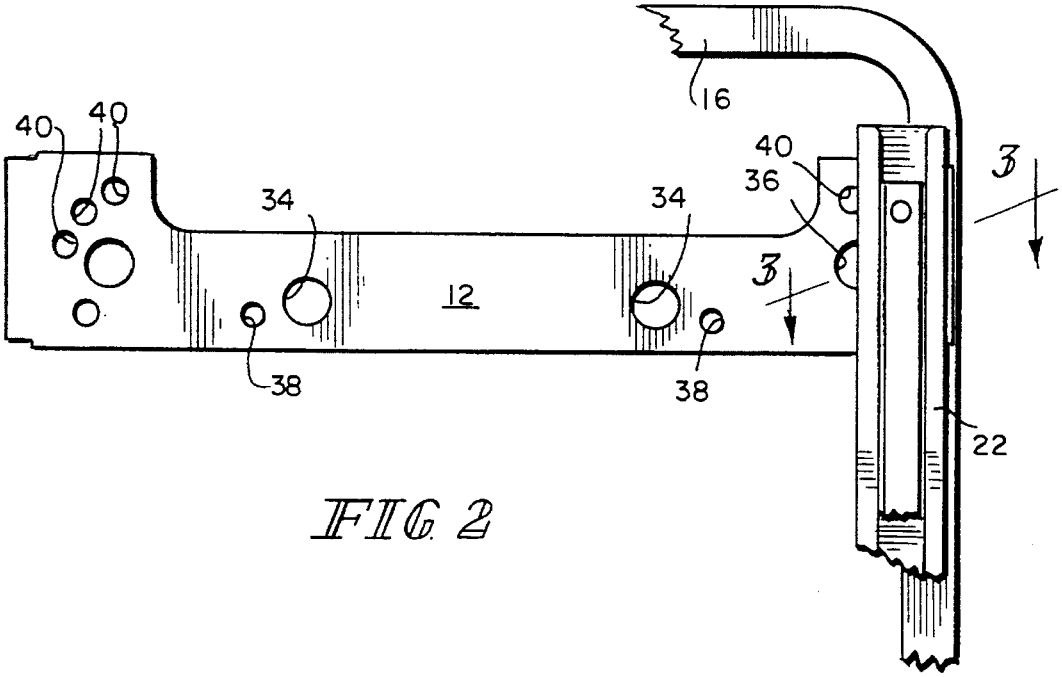
FIG. 2 is a plan view of the front bracket and a portion of a vehicle slide adjuster.
Figure 3:
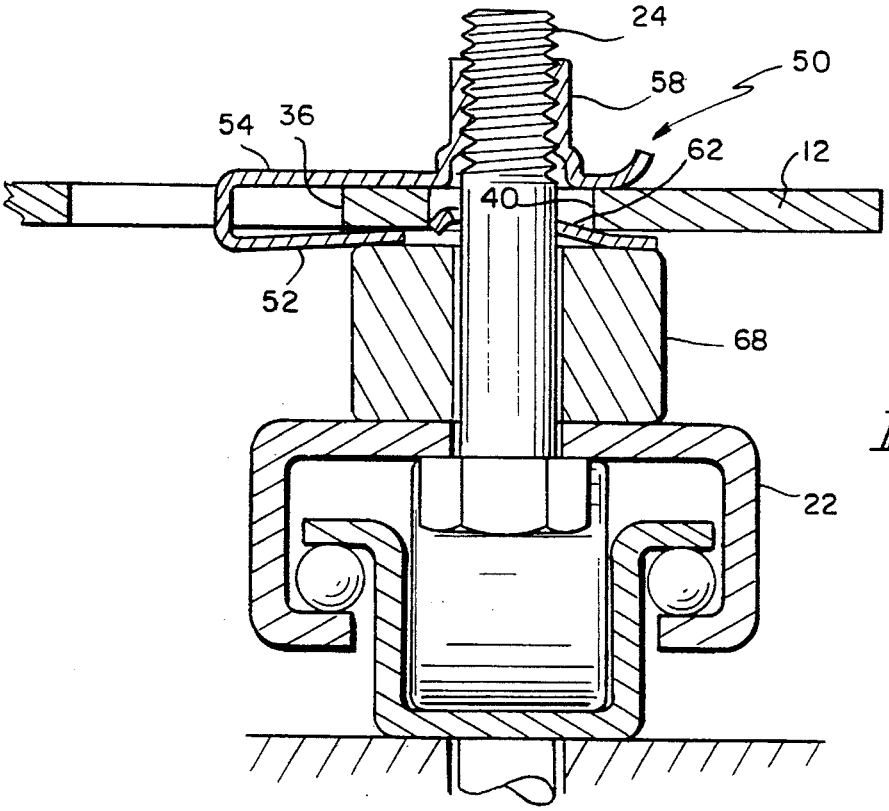
FIG. 3 is a cross-sectional view of the connection of a bracket of the present invention to a vehicle seat slide adjuster.

Referring now to the drawings, in which like-referenced characters indicate corresponding elements throughout the several views, attention is first directed to FIG. 1 which illustrates a first preferred embodiment of a uni-brace mechanism. In this embodiment, the uni-brace mechanism includes a pair of spaced brackets which are attached to the underside of a vehicle seat. The uni-brace mechanism is designed to also be attached to a vehicle seat slide adjuster which is mounted to the floor board of the vehicle.

The uni-brace mechanism of the first preferred embodiment includes front bracket 12 and rear bracket 14. Each bracket is a generally flat plate member of a generally rectangular shape. Each bracket is preferably made of a sturdy, rigid material, such as thin gauge mild steel. Front bracket 12 and rear bracket 14 arc each attached to frame 16 on the underside of vehicle seat 18. In the preferred embodiment shown, the two brackets are welded to frame 16. The two brackets are spaced apart, such that front bracket 12 is adjacent the front of vehicle seat 18 and rear bracket 14 is adjacent the rear of vehicle seat 18. The two brackets arc preferably positioned substantially parallel to one another, and secured to frame 16 so as to form a relatively permanent bond therebetween.

Front bracket 12 includes cut-out 19 therein. Cut-out 19 allows a seat release mechanism (not shown) or similar device to be placed under vehicle seat 18, adjacent its front end, without interfering with front bracket 12.

The uni-brace mechanism of the present invention allows vehicle seat 18 to be attached to vehicle seat slide adjuster 20. Typically, vehicle seat slide adjuster 20 includes a pair of oppositely disposed rails 22 having a bolt 24 extending therethrough at the distal end of each rail 22. Thus, vehicle seat slide adjuster 20 typically includes four bolts 24 arranged in a generally rectangular pattern. The spacing between bolts 24 varies from manufacturer to manufacturer, and thus each vehicle seat 18 has previously been designed to receive the bolt pattern of a particular vehicle seat slide adjuster. Front bracket 12 and rear bracket 14 allow vehicle seat 18 to be attached to vehicle seat slide adjuster 20 of any current manufacture.

In the preferred embodiment of the present invention, rear bracket 14 includes two pairs of receiving holes, first pair 26 and second pair 28. First pair of receiving holes 26 includes at least one engagement hole 30 for each receiving hole 16. Engagement hole 30 is spaced from its corresponding receiving hole 26 at a predetermined distance and angle. It is most preferred that each receiving hole 26 includes one corresponding engagement hole 30. Second pair of receiving holes 28 includes a plurality of corresponding engagement holes 32. Preferably, receiving holes 28 each include three corresponding engagement holes 32. Each engagement hole 32 is spaced from receiving hole 28 at a predetermined distance and angle. As is shown in FIG. 1, first pair of receiving holes 26 and their corresponding engagement holes 30 are positioned closer to the longitudinal center of rear bracket 14, while second pair of receiving holes 28 and their corresponding engagement holes 32 are positioned nearer the distal ends of rear bracket 14.

Front bracket 12 also includes two pairs of receiving holes, first pair 34 and second pair 36. First pair of receiving holes 34 each include at least one engagement hole 38 corresponding thereto, positioned at a predetermined distance and angle from receiving hole 34. Preferably, each receiving hole 34 includes one corresponding engagement hole 38. Front bracket 12 also includes a second pair of receiving holes 36. Each receiving hole 36 includes a plurality of corresponding engagement holes 40 spaced thereabout. In the preferred embodiment shown, each receiving hole 36 includes four corresponding engagement holes 40. Each engagement hole 40 is positioned at a pre-determined distance and angle from the corresponding receiving hole 36.

Figure 4:
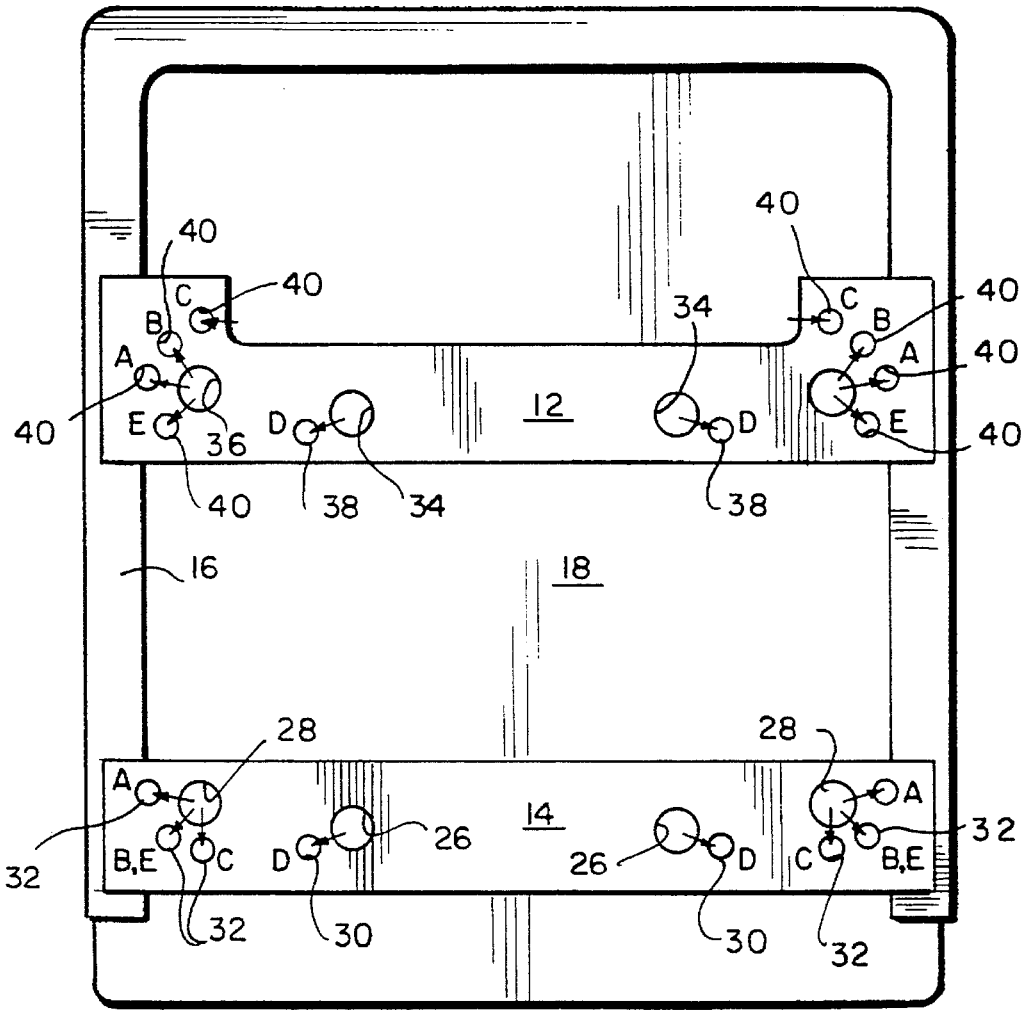
FIG. 4 is a bottom view of the front and rear bracket of the present invention.
Figure 5:
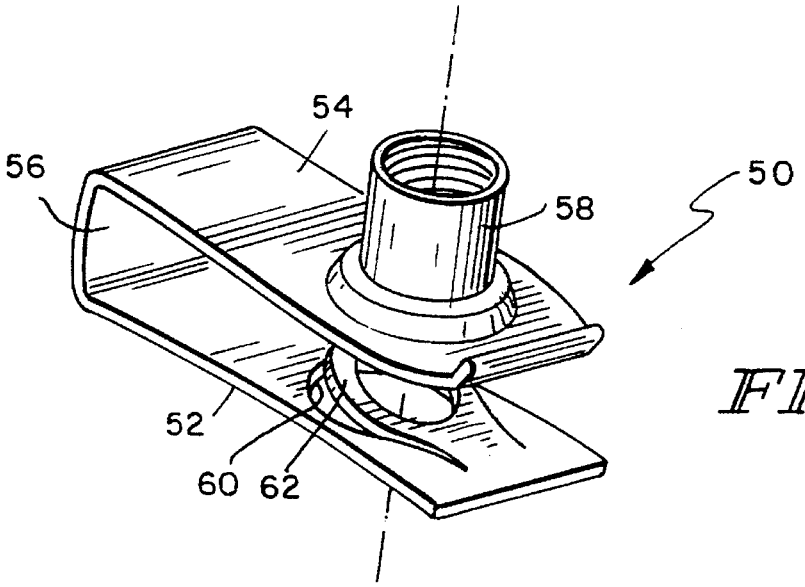
FIG. 5 is a perspective view of a clip of the present invention.

In the preferred embodiment shown, first pair of receiving holes 26 on rear bracket 14 each includes one corresponding engagement hole 30, each indicated by the letter D on FIG. 4. The center of engagement hole D is approximately 1 inch from the center of its corresponding receiving hole 26, and is positioned from receiving hole 26. First pair of receiving holes 34 on front bracket 12 also each include one corresponding engagement hole 38, also indicated by the letter D. Each engagement hole D on front bracket 12 are located approximately 1 inch from the center of corresponding receiving hole 34. Thus, there are four engagement holes generally indicated by the letter D. The four engagement holes D form a generally rectangular hole pattern to correspond to the bolt pattern found on a vehicle seat slide adjuster 20 of current manufacture.

In a similar manner, the engagement holes corresponding to the second pair of receiving holes 28 on rear bracket 14 and second pair of receiving holes 36 on front bracket 12 also combine to form generally rectangular patterns. Each of the three engagement holes 32 on rear bracket 14 are positioned at predetermined distances from each receiving hole 28. The center of each engagement hole indicated by the letter A on FIG. 4 on rear bracket 14 is approximately flinches from the center of its corresponding receiving hole 28. Hole B,E is approximately 1 inch from receiving hole 28. Engagement hole C is positioned approximately 1⅛inches from the center of receiving hole 28.

Front bracket 12 includes four engagement holes 40 spaced about each receiving hole 36. The approximate distance each engagement hole 40 is spaced from receiving hole 36 is listed in the following table:

| Hole | Approximate Distance from Receiving Hole 36 |
|---|---|
| A | ⅞" |
| B | 1" |
| C | 1¼" |
| E | 1" |

Thus, the uni-brace mechanism of the present invention includes five hole patterns, each pattern having at its corner a like-referenced engagement hole. For example, the four engagement holes of the uni-brace mechanism indicated by the letter A form a generally rectangular hole pattern, corresponding to a bolt pattern on vehicle seat slide adjuster 20 of current manufacture. Likewise, the patterns form by the engagement holes indicated by the letters B, C, D and E form generally rectangular hole patterns. In the preferred embodiment shown, the five hole patterns are spaced at the following approximate dimensions:

| Hole Pattern | Front/Rear Dimension | Side-To-Side Dimension |
|---|---|---|
| A | 12.00" | 14.72" |
| B | 13.31" | 14.00" |
| C | 14.00" | 12.875" |
| D | 11.50" | 8.00" |
| E | 11.50" | 14.00" |

As can be seen in FIG. 1, each receiving hole and each engagement hole of the uni-brace mechanism in the preferred embodiment is preferably of a generally circular configuration. However, it should be understood that each receiving hole and each engagement hole could be of any regular or unregular shape or design, so long as the general dimensions discussed above are maintained.

The uni-brace mechanism of the present invention also includes clip 50. Clip 50 can be any member which engages a receiving hole and a corresponding engagement hole, providing the engagement hole with a threaded orifice. It is preferred that clip 50 be an ordinary, grade 5 pal nut. Clip 50 includes upper lip 52 and lower lip 54, which are connected by bight 56. Depending from lower lip 54 is internally threaded hub 58. Upper lip 52 includes opening 60 therein, which is vertically aligned with hub 58. Depending from upper lip 52 adjacent opening 60 is spring element 62.

Having described the structure of the preferred embodiment of the uni-brace mechanism of the present invention, its function can now be readily understood. Front bracket 12 and rear bracket 14 are attached to frame 16 of vehicle seat 18. Vehicle seat 18 can then be mounted to vehicle seat slide adjuster 20. Having determined the location of bolts 24 on vehicle seat slide adjuster 20, the Corresponding engagement hole pattern on the unibrace mechanism is determined. Once the proper engagement holes are chosen, clip 50 is inserted into the engagement hole and its corresponding receiving hole. Clip 50 is inserted into a receiving hole such that upper lip 52 is adjacent the top surface of each bracket, and lower lip 54 is adjacent the bottom surface of each bracket. Clip 50 is then guided toward the proper engagement hole until spring element 62 is accepted in the engagement hole. In this position, opening 60 and hub 58 form a single bore through which each bolt 24 on vehicle seat slide adjuster 20 may be threaded.

The positioning of clip 50 into each engagement hole C on front bracket 12 does not include engagement of the corresponding receiving hole. When these engagement holes are utilized, clip 50 is positioned from an exterior edge of the bracket, such that bight 56 is adjacent the edge of bracket 12. The arrows on FIG. 4 indicate the direction that clip 50 is positioned with respect to each engagement hole.

Once clip 50 is secured into the four proper engagement holes, each bolt 24 on vehicle seat slide adjuster 20 is inserted through opening 60 and the engagement hole, into hub 58. Each bolt 24 is tightened, thus securing vehicle seat slide adjuster 20 to the uni-brace mechanism. It is preferred that spacer 68 be included between vehicle seat slide adjuster 20 and each clip 50 to provide clearance between vehicle seat slide adjuster 20 and vehicle seat 18.

It should be readily understood that certain structural modifications could be made to the present invention without altering its function or purpose. For example, front bracket 12 and rear bracket 14 could be replaced by a single plate, having the various receiving holes and engagement holes located therein. Furthermore, it should be recognized that front bracket 12 and rear bracket 14 could be replaced by brackets which extend substantially parallel to vehicle seat slide adjuster rails 22. Furthermore, four separate plates, positioned at extreme corners on the underside of vehicle seat 18 could be used in place of front bracket 12 and rear bracket 14.

It should also be readily understood that means other than clip 50 could be used to secure the vehicle seat to the vehicle seat slide adjuster. For example, each engagement hole could be provided with a threaded nut fastened adjacent the hole. Furthermore, each engagement hole could be internally threaded to receive a bolt therethrough. It should also be understood that any combination of these variations could be utilized.

The detail on which the present invention has been described is by way of illustration and example only and is not to be taken as a limitation of the present invention. The scope and content of the present invention is defined only by the terms of the appended claim.

What is claimed:

1. A mechanism for attaching a vehicle seat to a pair of vehicle seat slide adjusters, which adjusters slide along rails attached to a vehicle floor to allow for longitudinal adjustment of the seat in a vehicle and wherein said mechanism provides a universal mount for vehicle seats for different vehicles that have different spacing between the rails and different spacing between mounting bolts on the slide adjusters, comprising:

at least two bracket assemblies fixedly attached to a vehicle seat frame;

each of said at least two bracket assemblies having a plurality of receiving holes placed in a pattern therein, wherein at least two of said plurality of receiving holes are spaced from one another in at least a longitudinal direction of the seal frame and wherein at least two of said plurality of said holes are also spaced from one another in a width direction of the seat frame;

at least two slide adjusters, one each for sliding along a respective one of the rails attached to the vehicle floors;

wherein each of said two slide adjusters have at least two spaced apart mounting bolt means for attaching the slide adjusters to the vehicle seat bracket means;

first means for mounting at least one of said two spaced apart mounting bolt means to one of said receiving holes in one of said at least two bracket assemblies;

second means for mounting the other of said at least one of said two spaced apart mounting bolt means to a receiving hole in another of said at least two bracket assemblies; and wherein the pattern of receiving holes in said bracket assemblies can accommodate varying distances between mounting bolt means on a single slide adjuster and varying distances between rails.

2. The mechanism according to claim 1, wherein said first and second means for mounting includes a clip which engages said receiving hole.

3. The mechanism according to claim 1 wherein said clip is internally threaded.

4. The mechanism according to claim 1 wherein said clip is a pal nut.

5. The mechanism according to claim 2, wherein each of said bracket assemblies also includes a least one corresponding engagement hole spaced from said plurality of receiving holes and wherein a portion of said clip passes through said engagement hole.

6. The mechanism according to claim 2 wherein a portion of the clip passes through an engagement hole located in one of the at least two bracket assemblies.

*7. A mechanism for attaching a vehicle seat frame to a pair of vehicle seat slide adjusters, the slide adjusters being attachable to the seat frame, wherein the mechanism comprises:*

*at least one bracket assembly attached to the vehicle seat frame;*

*wherein the bracket assembly includes at least two engagement hole patterns therein, each engagement hole pattern comprising four engagement holes defining a generally rectangular pattern, and wherein at least two of the engagement hole patterns have different length and width dimensions;*

*each of the slide adjusters having two mounting bolts secured to the slide adjusters; and*

*a clip which is engageable with an engagement hole and at least one of the mounting bolts to facilitate the attachment of the vehicle slide adjuster to the vehicle seat frame.*

*8. The mechanism according to claim 7 wherein the bracket assembly includes at least one receiving means associated therewith.*

*9. The mechanism according to claim 8 wherein the receiving means includes a receiving hole.*

*10. The mechanism according to claim 9 wherein the receiving means includes a plurality of holes spaced in a generally rectangular pattern.*

*11. The mechanism according to claim 7 wherein the receiving means includes a portion of the bracket assembly adjacent an exterior edge of the bracket assembly.*

* * * * *